United States Patent [19]

Herriott et al.

[11] Patent Number: 4,810,861

[45] Date of Patent: Mar. 7, 1989

[54] INFORMATION CARRIER AND READER

[75] Inventors: Victor L. Herriott, Newport; Roy S. Jefferies, Bridgnorth, both of United Kingdom

[73] Assignee: Lowe & Fletcher Limited, West Midlands, England

[21] Appl. No.: 79,776

[22] PCT Filed: Sep. 22, 1986

[86] PCT No.: PCT/GB86/00563

§ 371 Date: Jun. 25, 1987

§ 102(e) Date: Jun. 25, 1987

[87] PCT Pub. No.: WO87/02736

PCT Pub. Date: May 7, 1987

[30] Foreign Application Priority Data

Oct. 25, 1985 [GB] United Kingdom ................. 8526394

[51] Int. Cl.⁴ ................................................ G06K 7/10

[52] U.S. Cl. .................................... 235/382; 235/454; 235/448; 70/DIG. 51; 340/542; 340/825.31; 361/177; 250/221

[58] Field of Search ................. 70/277, 278, 283, 382, 70/383, 399, DIG. 51; 235/382, 382.5, 454, 482, 499, 448; 250/221, 222.1, 229; 340/542, 543, 825.31, 825.32; 361/171, 172, 174, 175, 176, 177

[56] References Cited

U.S. PATENT DOCUMENTS

| | | | |
|---|---|---|---|
| 3,627,994 | 12/1971 | Sallach et al. | 340/825.31 |
| 3,889,501 | 6/1975 | Fort | 70/DIG. 51 |
| 4,333,073 | 6/1982 | Caruso | 340/543 |
| 4,721,956 | 1/1988 | Demster | 340/825.56 |

FOREIGN PATENT DOCUMENTS

| | | | |
|---|---|---|---|
| 1321529 | 12/1963 | France | 70/DIG. 51 |
| 7400544 | 8/1974 | France . | |

*Primary Examiner*—A. D. Pellinen
*Assistant Examiner*—H. L. Williams
*Attorney, Agent, or Firm*—Marshall, O'Toole, Gerstein, Murray & Bicknell

[57] ABSTRACT

An information carrier (17) has formations (20,21) which are engaged by contact elements (30,32) during insertion of the carrier into a receiving member (39) the movement of the contact elements is amplified and transmitted by levers (26,33) to respective means (25,34) for providing electrical signals representing movement of the contact elements.

13 Claims, 3 Drawing Sheets

INFORMATION CARRIER AND READER

This invention relates to an information carrier and to a reader for reading information from the carrier.

Information carriers in the form of cards, with which there are associated magnetic fields representing the information, and readers for reading the magnetically encoded cards are well known. A further example of an information carrier of a well-known form is a key having notches or other formations which identify the key. For verifying the key applied to a lock, it is common for the lock to be equipped with tumblers which are engaged by the formations on the key and set in respective releasing positions by those formations. In at least some circumstances, a key is a more convenient and more reliable portable information carrier than is a magnetically encoded card but the number of different keys which can be verified by a traditional tumbler lock is small; whereas a card-reader can verify a very large number of different cards.

In GB No. 2,055,951, there is disclosed a pin-tumbler cylinder lock having means for sensing the movement of one tumbler and providing an electrical signal representing movement of that tumbler. The lock also includes a number of electrical contacts which are spaced apart along the keyway and the hey has, along a first edge, notches for positioning the tumblers and, along a second edge, electrical contact elements for contacting selected ones of the contact elements of the lock. Accordingly, the key can be verified by means of positioning of the tumblers in the usual way by the key, by means of movement of one of the tumblers during insertion of the key and by means of sensing of electrically conductive parts of the key.

The present invention provides an information carrier and a reader therefore, in which carrier the information is represented by formations having a mechanical character and the reader being capable of providing an electrical signal representing said formations. By a reader, we mean herein a device which has a member for receiving the information carrier but which member does not have tumblers moved by the carrier into releasing positions. The receiving member of a reader which forms a part of a combination in accordance with the present invention defines a path along which an information-bearing part of the carrier is moved during reading and the reader includes a contact element mounted in the receiving member for movement relative thereto transversely of said path and for engaging the formations of the carrier during reading, a signalling means for providing a signal representing the information from the carrier and transmitting means for transmitting motion from the contact element to a signalling means, the transmitting means including a lever arranged for pivoting relative to the receiving member about an axis which is transverse to the length of said path.

The lever may be arranged for amplifying the movement of the contact element and applying the amplified movement to the signalling means.

The contact element may be a rolling element mounted in the receiving member for rolling on an information carrier, when moved along said path. A follower may be interposed between the contact element and the lever.

The receiving member preferably defines a channel in which the lever, or at least a part of the lever, is disposed.

The receiving member preferably defines an elongated slot for receiving an information-bearing part of the carrier. The carrier may further comprise a head which cannot enter the slot of the receiving member. The lever preferably extends in a direction parallel to the length of the slot to a position which is beyond the end of the information-bearing part of the carrier, when that part is fully inserted into the slot.

Examples of information carriers and readers embodying the present invention will now be described, with reference to the accompanying drawings, wherein.

Figure 1:
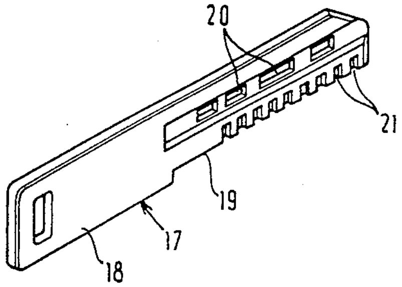
FIG. 1 shows a perspective view of a first information carrier.

The information carrier shown in FIG. 1 has a form generally similar to that of a key and is referred to hereinafter as a key. The key includes a handle 18 at one end and an elongated portion 19 bearing information represented by formations which are arranged in at least one row on the key. These formations may be apertures which extend completely through the thickness of the key but are more preferably recesses which extend only partly through the thickness of the key. Respective rows can then be provided on opposite major faces of the key. In the example illustrated, the information is represented by apertures 20 arranged in a single row extending along the portion 19 of the key. This portion has a substantially rectangular profile, as viewed in a plane transverse to its length, and each of the apertures 20 extends from one major face of the key to the other major face. Adjacent to one minor face and to one major face of the key, the portion 19 defines a row of recesses 21. These recesses constitute a clocktrack, the function of which will be explained hereinafter. It will be noted that the apertures 20 and the recesses 21 are all parallel-sided.

Figure 2:
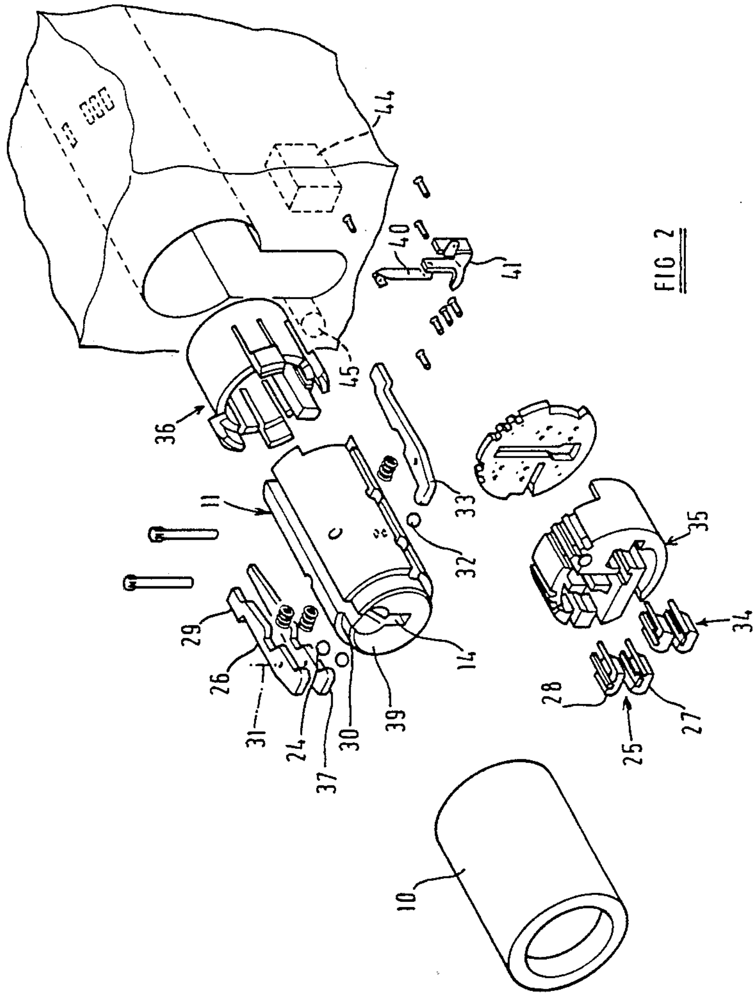
FIG. 2 shows separated from each other components of a reader for reading the carrier of FIG. 1.

In different examples of key intended to be read by the reader of FIG. 2, the clocktracks may be the same. The information tracks will generally differ from one key to another.

The reader shown in FIG. 2 comprises a hollow housing 10 containing a key-receiving member 11 which is fixed with respect to the housing. In a case where the reader is to be installed in a larger member which can serve as a housing, the housing 10 may be omitted. The member 11 defines a keyslot 14 which may extend along the entire length of the member 11 and which has a substantially rectangular shape, in planes perpendicular to the length of the member 11.

The reader further comprises reading means for reading information from the key 17, when the key is inserted into the slot 14. The reading means comprises a first contact element 24 which is mounted in the member 11 adjacent to the keyslot 14 for engaging the key and traversing the row of apertures 20 of the latter. The reading means further comprises signalling means 25 for providing an electrical signal representing the information which is represented by the apertures 20. There is further provided transmission means 26 for transmitting motion from the contact element to the signalling means 25.

The signalling means 25 comprises a diode 27 for emitting radiation, a detector 28 for receiving that radiation and an obstructing element 29 which can move into a position between the diode and the detector where the element 29 obstructs the transmission of radiation from the diode to the detector and can be moved out of the path of radiation from the diode to the detector. In the example illustrated, the obstructing element 29 is an end portion of a lever which constitutes the transmitting means 26. This lever is mounted in a groove 30 formed in the member 11 for pivoting relative thereto about a pivot axis 31 which is perpendicular to the length of the member 11. It will be noted that the pivot axis 31 is much nearer to the first contact element 24 than to the obstructing element 29. Accordingly, the transmitting means 26 amplifies motion transmitted from the contact element to the obstructing element. The lever is biased by a spring into engagement with the contact element.

The first contact element 24 is guided by the member 11 for reciprocation along a path which is perpendicular to the length of that member. The contact element is adapted to roll on adjacent surfaces of the member 11 and/or on the key 17 when the latter is inserted into and is removed from the keyslot 14. The preferred form of the contact element is a ball. The member 11 is formed to limit travel of the ball in the keyslot 14. When one of the apertures 20 is aligned with the contact element, the contact element can penetrate a significant distance into the aperture, for example a distance within the range one half to one millimetre. The transmitting means 26 may amplify the movement of the contact element by a factor within the range 3 to 5.

A second contact element 32 is mounted in the member 11 in the same manner as is the contact element 24. This second contact element is positioned so as to be aligned with the row of recesses 21 of the key 17, when the latter is inserted into the keyslot 14. With the second contact element, there are associated transmitting means 33 and signalling means 34 arranged in the same manner as are the transmitting means 26 and signalling means 25. In the example illustrated, the transmitting means 26 and 33 lie on opposite sides of the keyslot 14. However, both transmitting means could lie at the same side of the keyslot. Furthermore, additional followers, transmitting means and signalling means may be provided for reading additional information from the key.

The signalling means are conveniently mounted in a separately formed holder 35 which is secured on the member 11. This is achieved by a cap 36 which fits over the holder 35 and has resilient fingers which are a snap-fit in the housing 10.

The reader also includes means for providing an entry signal upon entry of a key or other instrument into the keyslot 14 and for providing a key-home signal when the key 17 has been fully inserted. This means includes a further lever 37 mounted in a further groove formed in the member 11 and having an end portion 38 adjacent to an outer end face 39 of the member 11. The end portion 38 protrudes into the keyslot 14 and is urged towards such a position by a spring. As shown, a further ball is preferably interposed between the end portion 38 and the key present in the keyslot. A pair of resilient switch contacts 40, 41 is provided inside the cap 36 and an end portion of the lever 37 remote from the portion 38 is arranged for engagement with the contact 40 to move same into engagement with the contact 41 when the key is introduced into the keyslot 14. When the key is fully inserted, it engages the contact 41 and moves this contact out of engagement with the contact 40. It will be noted that the holder 35 defines a passage through which a tip of the key can pass to the contacts 40 and 41.

There is associated with the reader a microprocessor 44 for processing information read from the key 17. The microprocessor incorporates a source of electrical power, for example a battery of cells. The electrical contacts and the signalling means are connected with the microprocessor by wiring which is omitted from FIG. 2. The microprocessor may be adapted to verify the key, in which case the processor includes a memory in which there is stored information corresponding to the information borne by the authorised key. Information which is read from the key is compared with the stored information and an appropriate output is provided by the microprocessor. The output from the microproccessor may be used to control an associated device, for example data-processing apparatus, or an electrically energisable release mechanism for a door latch or bolt.

Figure 3:
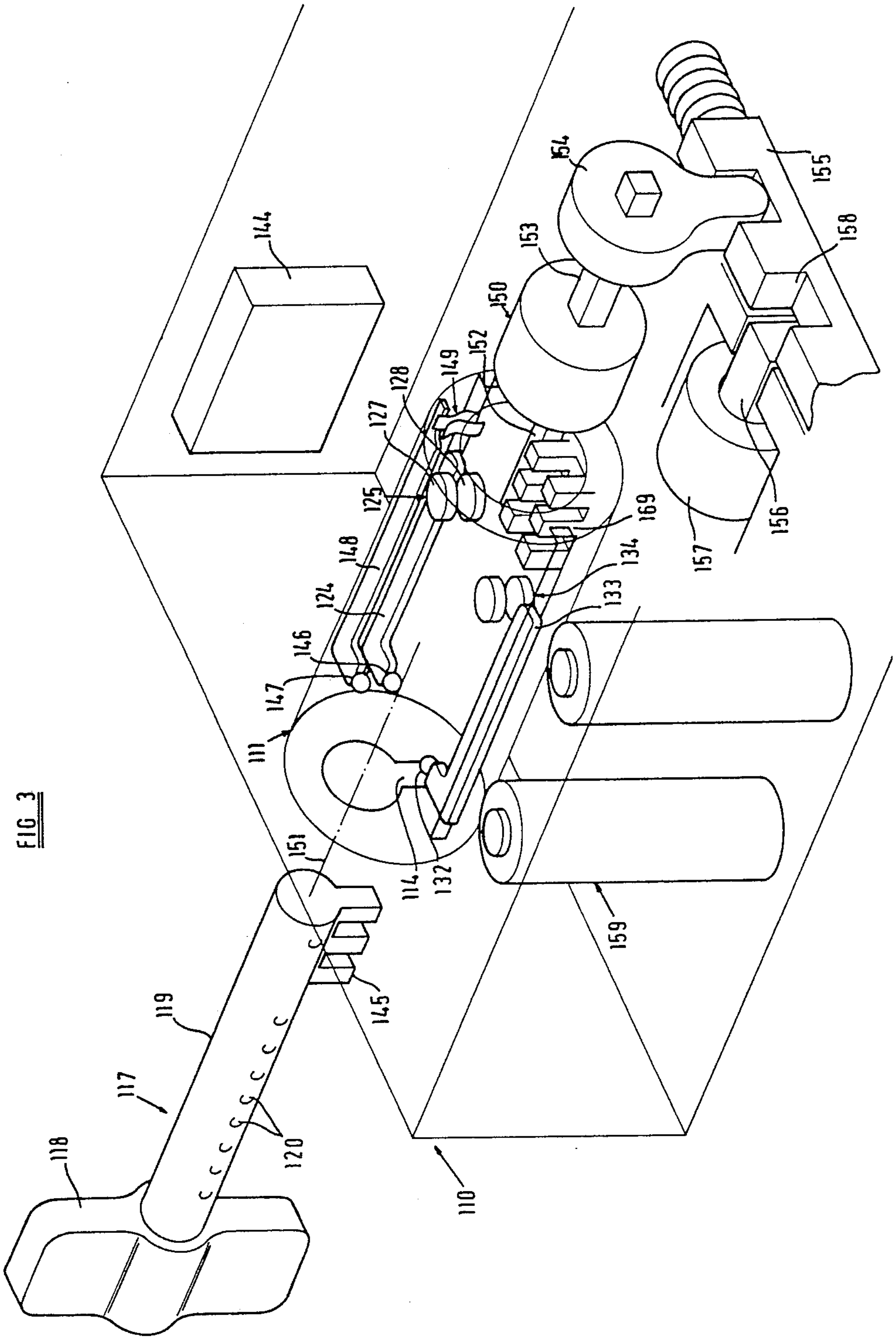
FIG. 3 shows diagrammatically a perspective view of a key, a reader for reading information from the key and of a bolt mechanisn operable by the key.

Certain parts of the reader illustrated in FIG. 3, correspond to parts of the reader herein described with reference to FIG. 2. In FIG. 3, such corresponding parts are identified by like reference numerals with the prefix "1" and the preceding description is deemed to apply, except for the differences hereinafter mentioned.

The reader of FIG. 3 is suitable for reading information from the key 117 which comprises an elongated stem 119 having the handle 118 at one end thereof and wards 145 adjacent to an opposite end of the stem. A row of depressions 120 representing information which identifies the key is formed along the stem 119 at one side thereof and a similar row of depressions, which constitutes a clocktrack, is formed along an opposite side of the stem. In the example illustrated, the stem 119 is generally cylindrical and the wards 145 project radially from the stem. Accordingly, the elongated slot 114 defined by the member 111 for receiving the key has a generally cylindrical portion for receiving the stem and a rectangular portion for receiving the wards.

Near to the open end of the keyslot 114 there are mounted in the member 111 contact elements 132 and 146 for engaging the stem 119 along respective rows of depression, when the stem is introduced into the reader. With the contact element 132, there is associated a lever 133, an end portion of which constitutes an obstructing element of signalling means 134. Corresponding signalling means 125 and lever 124 are associated with the contact element 146.

A further contact element 147, lever 148 and electrical contacts 149 are provided for providing to the microprocessor 144 a key-insertion signal. The levers 124, 133 and 148 are conveniently mounted in respective channels formed in the member 111. Each lever is arranged with its length extending parallel to the length of the keyslot 114. The levers 124 and 148 have a common pivot axis perpendicular to the length of the keyslot and lying at one side thereof, whilst the lever 133 has a pivot axis also perpendicular to the length of the keyslot and lying at the opposite side thereof.

There is provided inside the member 111 at a position remote from the open end of the keyslot 114 an arrangement of wards 169 complimentary to the wards 145 of the key. When the key has been fully inserted into the member 111, the wards 145 are aligned with the wards

169 so that the key can be turned about a longitudinal axis of the stem 119.

There is mounted in the housing 110, in co-axial relation with the member 111, an output element 150 which is rotatable relative to the body about the axis 151. The output element has an eccentric element 152 normally disposed adjacent to, but outside the wards 149. This eccentric element is engageable by the wards 145 of the key to receive torque from the key, so that the proper key can be used to turn the output element 150. The output element is coupled by a drive shaft 153 with a cam 154 of a cam mechanism for reciprocating a bolt 155 also mounted in the body 110.

For controlling reciprocation of the bolt 155, there is provided disabling means which includes a plunger 156 and a solenoid 157 for reciprocating the plunger. The plunger is guided by parts of the body 110 for reciprocation along a path which is perpendicular to the path along which the bolt 155 is guided by the body. When the bolt is in a locking or projected position, a recess 158 defined by the bolt is aligned with the plunger 156. The solenoid can then be energised to project the plunger into the recess 158 so that the plunger then lies partly in the bolt and partly between opposed guide surfaces of the body 110 to prevent reciprocation of the bolt. The plunger can be withdrawn from the recess 158 by energisation of the solenoid 157 with opposite polarity. The plunger 156 is preferably secured to a permanently magnetised armature.

Alternatively, the plunger may be arranged for co-operation with the output element 150. Thus, the plunger may be guided by the body for reciprocation between a projected position in which an end portion of the plunger occupies a recess defined by the output element and a retracted position in which the plunger is withdrawn from the output element. In either case, there may be associated with the plunger mechanical detent means for releasably retaining the plunger in a position to which it has been set by the solenoid.

Energisation of the solenoid 157 is controlled by the microprocessor 144. When the key 117 is withdrawn from the reader, the plunger 156 remains in its retracted position. The bolt is urged into the locking position by an associated spring in the usual way. If the key 117 is inserted into the reader once more, the microprocessor is alerted by a signal from the contacts 149 when the contact element 147 is expelled from the keyslot 114. If the key is an authorised key, information acceptable to the control means is read from the key during insertion of the key. When the key has been verified by comparison of information from the key with information contained in a memory of the microprocessor, the microprocessor decides not to energise the solenoid 157. When the key has been fully inserted, it can be turned to withdraw the bolt 155.

If there is introduced into the keyslot 114 a key or other instrument from which the control means does not read information acceptable to the control means, the microprocessor energises the solenoid 157 to project the plunger 156 into the recess 158 of the bolt and so prevent withdrawal of the bolt. The plunger 156 can then be withdrawn from the bolt only by insertion of an authorised key and reading from that key of information which is acceptable to the control means.

The depressions 120 are conveniently formed by means of a cutter rotating about and axis parallel to the length of the stem 119 and may therefore be elongate in a direction tangential to the stem.

The device illustrated in FIG. 3 may be modified by the provision of tumblers for controlling rotation of the output element 150 by means of the key, as an alternative to the provision of wards. In the modified device, the output element has a length somewhat greater than that represented in FIG. 3 and is of hollow form, to receive a part of the stem 119 of the key. Tumblers are arranged in a known manner, to co-operate with the output element and with the body 110 normally to restrain rotation of the output element relative to the body. The key would be provided with formations which co-operate in a known manner with the tumblers to displace these to respective releasing positions, when the key is inserted into the device, thereby releasing the output element for rotation. Means would also be provided for transmitting torque from the key to the output element. It will be understood that, in the modified device, the non-rotatable member 111 would lie between the output element 150 and the front of the device and contain the contact elements and levers, as illustrated in FIG. 3. For cooperation with the tumblers, the key may be provided with a bit occupying a position corresponding to that of the wards 145 shown in FIG. 3. Alternatively, formations defined by the stem 119 and extending in a row along the stem, as do the formations 120, may co-operate with the tumblers to set these in respective releasing positions.

The foregoing detailed description has been given for clearness of understanding only and no unnecessary limitations should be understood therefrom, as modifications will be obvious to those skilled in the art.

We claim:

1. A combination comprising an information carrier having mechanical formations representing information and a reader for reading said information from the carrier, wherein the reader comprises a receiving member for receiving an information-bearing part of the carrier and defining a path along which the carrier is moved during reading, a plurality of contact elements mounted in the receiving member for movement relative thereto transversely of said path and for engaging the formations of the carrier during reading, signalling means for providing a signal representing the information read from the carrier and transmitting means for transmitting motion from the contact elements to the signalling means, wherein the transmitting means includes a respective lever for each contact element, the levers being arranged for pivoting relative to the receive member about respective pivot axes which are transverse to the length of said path and wherein said pivot axes are spaced apart in a direction transverse to the length of the path.

2. A combination according to claim 1 wherein the transmitting means are arranged for amplifying movement of the contact elements and applying the amplified movement to the signalling means.

3. A combination according to claim 1 wherein each said lever is disposed in a groove formed in the receiving member.

4. A combination according to claim 1 wherein the pivot axis of each said lever lies between opposite ends of the lever, the signalling means is at one end of the lever and the contact element is so associated with the opposite end of the lever that said opposite end moves with the contact element.

5. A combination according to claim 1 wherein said receiving member has a surface defining an axis of curvature, the axis of curvature lies in said path and wherein the contact elements are spaced from one another around the axis.

6. A combination according to claim 1 wherein the signalling means comprises, for each contact element, a source of radiation, a sensor responsive to that radiation, when incident on the sensor, to provide an electrical signal and means for interrupting the transmission of radiation from the source to the sensor, the source and the sensor collectively defining an optical axis which is transverse to the length of said path.

7. A combination according to claim 1 wherein the dimensions of the information carrier and of the device are such that, during reading, the contact element undergoes repeated movements through substantially the same distance.

8. A combination according to claim 7 wherein said formations are depressions of substantially the same depth.

9. A combination according to claim 8 wherein each said depression has opposite boundary portions which are spaced apart in a direction along said path and which are substantially parallel to each other.

10. A combination according to claim 8 wherein each of said depressions is of substantially cylindrical shape.

11. A combination according to claim 1 wherein the information-bearing part of the carrier has a round cross-section in a plane transverse to the length of said part and wherein there is a plurality of rows of said formations, the rows being spaced from one another around said part of the carrier.

12. A combination according to claim 1 wherein said receiving member has a surface defining an axis of curvature, the axis of curvature lies in said path, the contact elements are spaced from one another around the axis, there is in the outer circumferential surface of the receiving member a plurality of grooves and wherein each said lever is disposed in a respective one of said grooves.

13. A combination according to claim 1 further comprising verifying means for verifying the information represented by said signal and disabling means for selectively preventing turning of the key relative t the signalling means, when the key is present in the receiving member and the verifying means has not verified said information, wherein, when the disabling means is inoperative, the key can be turned relative to the signalling means.

* * * * *